United States Patent

[11] 3,544,717

[72] Inventor Larrabee M. Smith
Holmdel, New Jersey
[21] Appl. No. 676,292
[22] Filed Oct. 18, 1967
[45] Patented Dec. 1, 1970
[73] Assignee Bell Telephone Laboratories, Incorporated
Murray Hill, New Jersey
a corporation of New York

[54] TIMING RECOVERY CIRCUIT
8 Claims, 12 Drawing Figs.

[52] U.S. Cl. .......... 178/69.5, 328/155
[51] Int. Cl. .......... H04l 7/00
[50] Field of Search .......... 178/69.5; 325/321, 325; 328/63, 72, 134, 155

[56] References Cited

UNITED STATES PATENTS

| | | | |
|---|---|---|---|
| 3,024,417 | 3/1962 | Secretan .......... | 328/42 |
| 3,440,547 | 4/1969 | Houcke .......... | 328/63 |

*Primary Examiner*—Robert L. Richardson
*Attorneys*—R. J. Guenther and E. W. Adams, Jr.

ABSTRACT: The phase of a locally generated square wave timing signal is compared to that of a received digital data bit stream which typically experiences short-term time or phase changes; the result of this comparison is used to rapidly change the phase of the timing signal to maintain the same in phase alinement with the received bit stream. However, in response to successive phase changes in the same direction, a phase correction control circuit is rendered operative to restrict to a preselected amount the rate at which the average phase of the timing signal may be changed continuously in said direction.

INVENTOR
L. M. SMITH
BY John K. Mullarney
ATTORNEY

TIMING RECOVERY CIRCUIT

BACKGROUND OF THE INVENTION

This invention relates to digital data communication systems and, more particularly, to the maintenance of synchronization of digital data receiver apparatus with a received digital data bit stream.

A digital data receiver requires timing information in order to interpret the received signal sequence properly. Each digital data bit in the sequence must be sampled at a time when its value has become fully established and it is not in a condition of transition.

Many transmission facilities, such as tropospheric scatter radio, introduce special timing problems that must be accounted for in establishing and maintaining a synchronous timing signal in the digital data receiver. First, the transmission facility utilized often introduces a short term time "jitter" or random variation in the phase of the received digital bit stream. This is frequently the result of multipath propagation. Since the possible paths differ in length, transmission time changes as the various paths fade randomly. This variation in phase or transmission time occurs at rates up to a few cycles per second. Accurate sampling of a received digital bit stream thus requires that the phase of the recovered timing signal be continually and rapidly adjusted to follow this short term time or phase jitter.

Second, fading introduces frequent outages of various time durations. Outages or bursts of noise up to about 0.5 second in duration commonly occur several times per hour. Thus, the need for maintaining bit-count integrity requires that the phase of the recovered timing signal be maintained within a fraction of a pulse interval (e.g. three-eights) through 0.5 second outages or bursts of noise.

SUMMARY OF THE INVENTION

It is accordingly the object of the present invention to provide for the accurate sampling of a received digital bit stream that jitters substantially in phase while, at the same time, insuring the maintenance of bit-count integrity through longterm outages and bursts of noise.

This invention relates to timing apparatus that provides for the accurate sampling of a received digital bit stream which jitters rapidly in phase and, at the same time, provides for the maintenance of bit-count integrity through longterm outages and bursts of noise. The phase of a locally generated square wave timing signal is compared to that of the received bit stream and the result of this comparison is used to rapidly change the phase of the timing signal to maintain the same in phase alinement with said received bit stream. However, in response to successive phase changes in the same direction (i.e., of the same sign), a phase correction rate control circuit is rendered operative to restrict to a preselected amount the rate at which the average phase of the timing signal can be changed continuously in said same direction. This rate of change restriction limits phase changes of the timing signal to a preselected fraction of a pulse interval (e.g. three-eights) through longterm outages or bursts of noise, thus maintaining the aforementioned bit-count integrity without affecting short term jitter-induced phase corrections.

DETAILED DESCRIPTION

Figure 1:
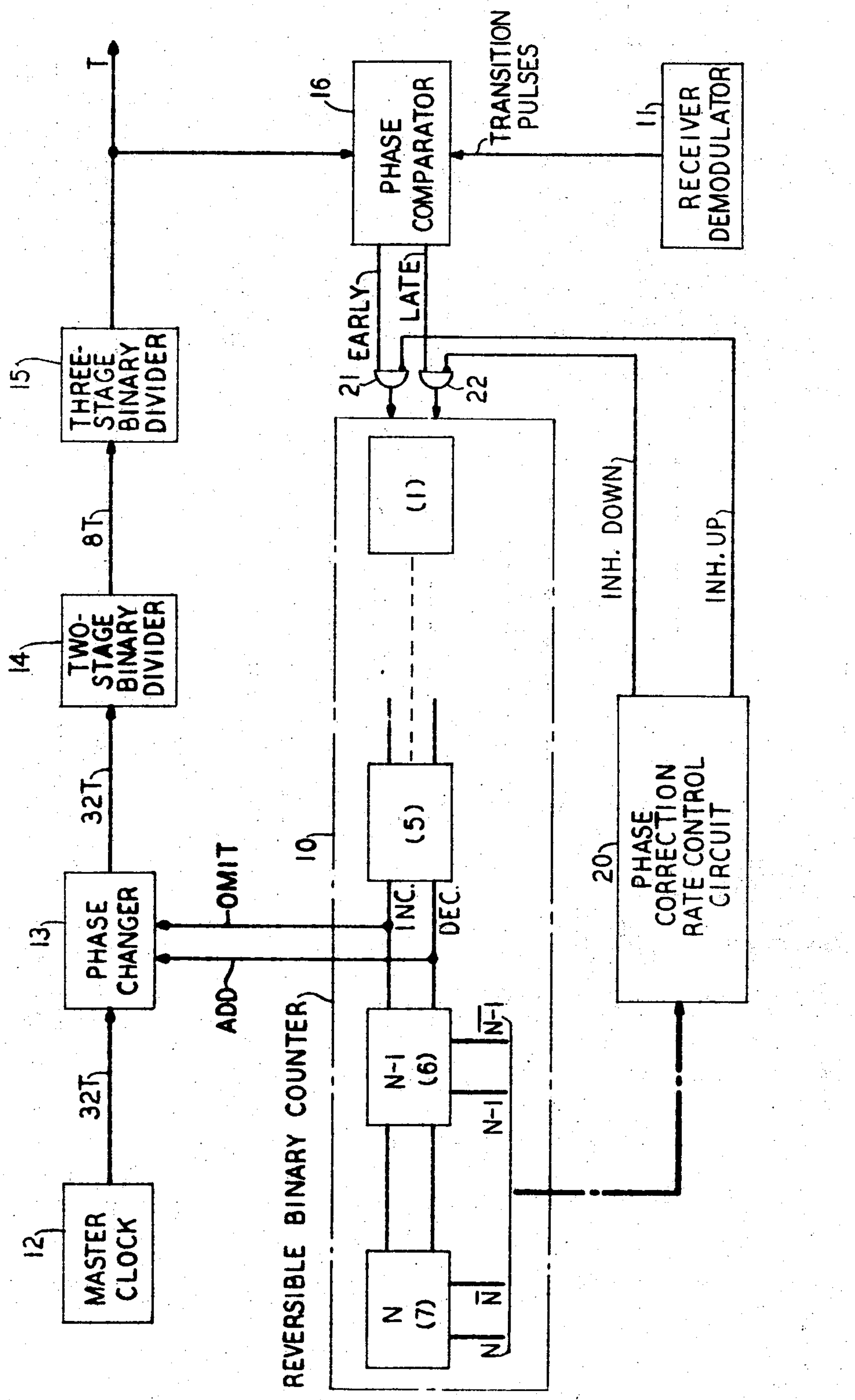
FIG. 1 illustrates a simplified schematic block diagram of timing phase recovery apparatus in accordance with the principles of the present invention.

The timing recovery apparatus illustrated in FIG. 1 of the drawings provides a means of adjusting the phase of a timing signal derived from an accurate oscillator on the basis of the relative phase of the timing signal and the transitions in state of the received baseband data signal. The incoming digital data baseband signal is demodulated in conventional fashion in the receiver-demodulator 11; the demodulated signal is illustrated in FIG. 3 by the waveform designated "Received Baseband Signal." The illustrated waveform comprises a mark signal followed by two space signals and then a second mark signal.

The receiver-demodulator 11 also includes a shaper which typically may comprise a properly poled series diode limiter that passes only signals of a given polarity, one or more stages of amplification followed by an amplitude limiter, and in this case, a differentiator circuit all in series connection.

Figure 3:
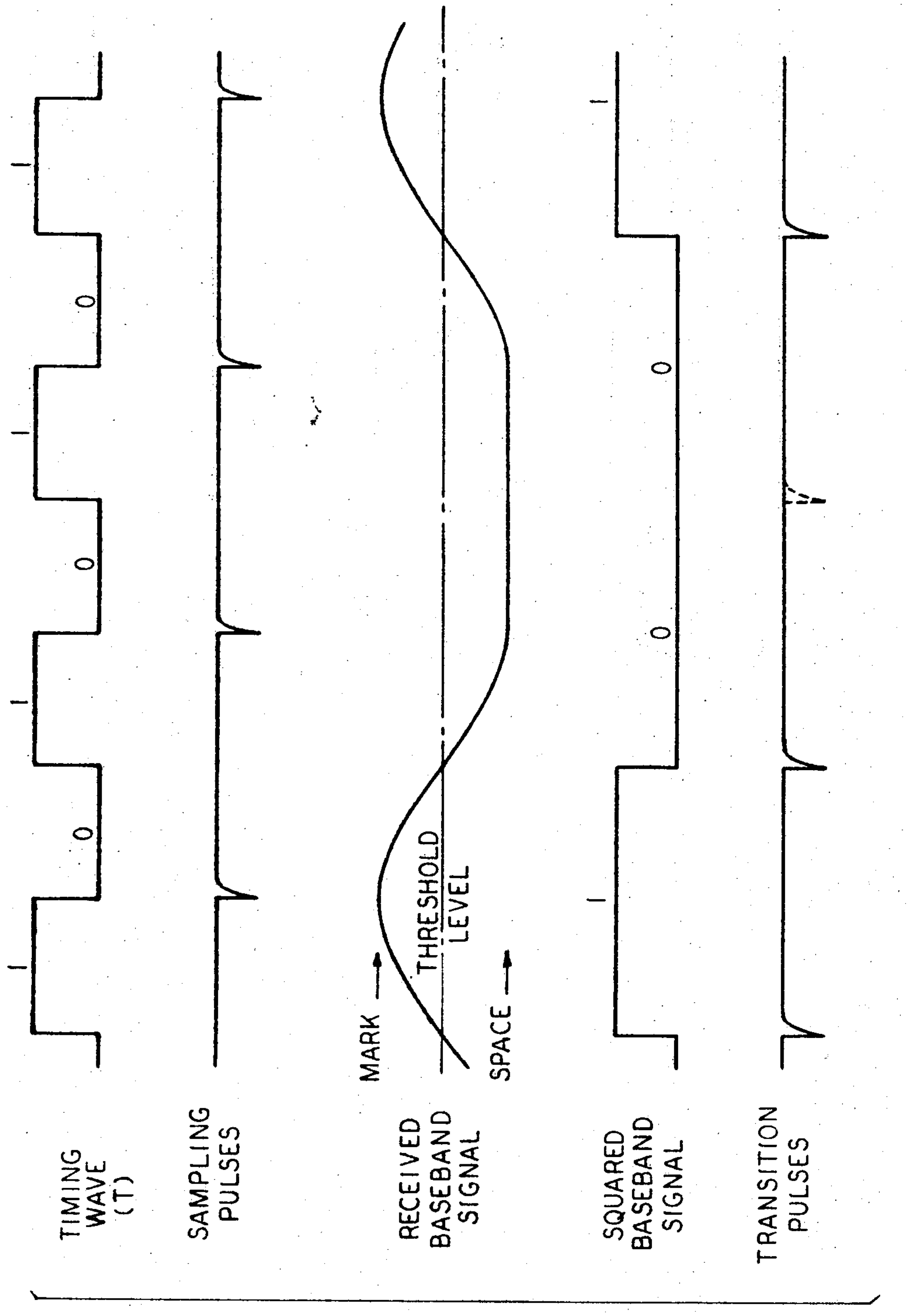
FIG. 3 shows certain waveforms useful in explanation of the invention.

The receiver baseband data signal is initially converted into the "Squared Baseband Signal" shown in FIG. 3. The transitions in state (1 to 0 or vice versa) of the squared baseband signal are determined by the threshold level which, as shown in FIG. 3, is set midway between the mark and space levels of the received baseband signal.

As will be more evident hereinafter, the phase alinement is established by comparing the phase of the locally generated timing signal T with pulses coincident with the transitions in state of the baseband data signals. To this end, the squared baseband signal of FIG. 3 is differentiated to provide the transition pulses shown therebelow in FIG. 3. Since the transition pulses are generated only in response to a transition in the state of the received baseband signal, the occurrence of successive mark signals or space signals will not generate transition pulses. Thus, as shown in FIG. 3, no transition pulse is developed when two successive space signals occur in the received baseband signal. In the absence of transitions (i.e., continuous mark or space signals), the locally generated timing signal T continues at a rate and phase determined by the local oscillator.

The master clock 12 comprises a crystal oscillator followed by a conventional square wave shaper circuit. The crystal oscillator is generally phase locked with, or periodically calibrated against, an automatic frequency standard such as a commercially available Cesium standard or a Rubidium standard. Numerous oscillator arrangements having accuracies of at least $\pm 1$ part in $10^7$ over long periods of time are commercially available, and any of these may be advantageously utilized herein. However, as will be clear to those in the art, The required clock accuracy is dependent primarily on the transmitted bit rate and the characteristics of the transmission medium involved.

The output of the master clock 12, designated 32T, is a square wave or pulse train occurring at a rate of 32 times the transmitted bit rate. Ignoring for the moment the phase changer 13, the 32T rate signal is divided by four in the two-stage binary divider 14 to obtain the signal 8T which, in turn, is then divided by eight in the three-stage binary divider 15 to obtain the timing signal T. If the 8T signal is not itself of use in other and different parts of the receiver apparatus, the two and three stage dividers can be replaced by a five-stage binary divider. As shown in FIG. 3, the timing signal T is a symmetrical square wave occurring at the transmitted digital bit rate and, ideally, in phase alinement with the squared baseband signal derived from the received digital data baseband signal.

As will be more evident hereinafter, phase alinement is established by comparing the phase of the timing signal T with the transition pulses derived from the received baseband data signals. On the average, the transition pulses occur 180° out of phase with the center of the digital data bit intervals. Accordingly, as shown in FIG. 3, if the pulses used to sample the received digital data bit stream are derived from the negative going transitions of the timing wave T, the sampling pulses will, on the average, midbit sample the received digital data stream. As will be evident to those in the art, it is desirable that each digital data bit in the received sequence be sampled at a time when its value has become fully established and it is not in a condition of transition (i.e., midbit sampling). The sampling pulses illustrated in FIG. 3 are obtained from the timing wave T by a straightforward process of differentiation.

The primary function of the remaining apparatus of FIG. 1 is to adjust the phase of T such that the received baseband signal is sampled in the center of the bit intervals thereof. However, the actual sampling of the received data bit stream is carried out by circuitry (not shown) and it in no way relates to the present invention.

The phase comparator 16 provides an output pulse for each transition pulse on one of two leads depending upon whether a transition pulse is early or late relative to the positive going transitions in the state of timing wave T. This phase comparator may comprise a simple gating circuit to which the timing wave T and the transition pulses are delivered. For example, the timing wave T and the transition pulses of FIG. 3 can be fed to an AND gate arrangement. Assuming the AND gate to be enabled when the timing wave T is in its positive or 1 state and disabled during the 0 state of the timing wave, it will be apparent that the phase comparator will pass transition pulses to a selected one of its output leads when the transition pulses suffer a relative phase lag. In this instance, the transition pulses will be in time correspondence with the 1 states of the timing wave. Alternatively, if the transition pulses and the inverse of the timing wave T shown in FIG. 3 are delivered to a second AND gate, the transition pulses will be passed to the other output lead of the phase comparator during those periods that the transition pulses are advanced in phase relative to the timing wave T, i.e., they occur during the 0 intervals of timing wave T. Thus, it is the relative phase between the transition pulses and the timing wave T that determines the "early" or "late" pulse output from the phase comparator 16.

Inasmuch as it is the phase of the timing wave T that is changed to maintain the same in phase alinement with the received data bit stream, it is desirable that the function of the phase comparator be discussed in terms of the relative phase advance or phase lag of the timing wave T with respect to the transition pulses. If the phase of timing wave T is "early" (i.e., a relative phase advance), a pulse is delivered by the phase comparator to the output lead designated "early". This early pulse causes an "up-count" or incremental advance in the state of the reversible binary counter 10. Alternatively, if the phase of the timing wave T is "late" (i.e., a relative phase lag), a pulse is delivered by the phase comparator 16 to the output lead designated "late". This late pulse causes a "down-count" or decrement in the state of the reversible binary counter 10.

As will be evident hereinafter, when the timing wave T is early an "omit" pulse is delivered from the counter to the phase changer 13 to retard the phase of the signal from the master clock 12 and, of course, retard timing wave T. Alternatively, when the timing wave T is late an "add" pulse is delivered to the phase changer 13 to advance the phase of the signal from clock 12. To summarize the above: an early T up-counts the counter 10, and the phase of the master clock signal (32T) and the timing wave T are consequently retarded; whereas, a late T down-counts the counter 10, and the phase of the master clock signal and T are thus advanced.

The phase correction operation carried out by phase changer 13 is the same as that set forth in the book entitled "-Data Transmission" by W. R. Bennett and J. R. Davey, McGraw-Hill Book Company, Inc. (1965), pages 260—261. If the timing wave T obtained from frequency-dividing the output of the master clock is found to be leading, in phase, a transition pulse, one of the pulses from the master clock is omitted or deleted, thus retarding the phase of T by one thirty-second of a bit interval. On the other hand, when the timing wave T is found to be lagging in phase, an extra count pulse is fed to the divider circuitry, thus advancing the phase of T by one thirty-second of a bit interval. This addition or omission of count pulses in the 32T bit stream by phase changer 13 is a practice well known and used in to art. In general, the binary divider circuitry can be of any size as long as the input pulse rate thereto is compatible. Thus, in the instant case, the input pulse rate is 32T which, when divided in the binary dividers 14 and 15 results in a timing wave of frequency T equal to the transmission bit rate. It should be apparent that the number of stages in the binary divider circuitry determines the accuracy of the timing phase corrections that can be achieved. Here, in the assumed case, phase corrections of one thirty-second of a bit interval are carried out. In general, the range of phase corrections is $\pm \frac{1}{2^n}$, where *n* is the number of stages in the divider circuitry. In Bennett and Davey, supra, the binary divider ratio is 64:1 and the phase of the timing signal can be advanced or retarded at each instance by one sixty-fourth of a bit interval. The choice of binary divider stages and the compatible input pulse rate delivered thereto is typically determined by empirical considerations.

The early and late pulses from the phase comparator 16 are delivered to the reversible binary counter 10 via the gates 21 and 22. The purpose and function of gates 21 and 22 will be described in detail hereinafter. The reversible binary counter 10, sometimes known as an up-down counter or a forward-backward counter is well known and extensively described in the literature; see, for example, "Pulse and Digital Circuits" by Millman and Taub, McGraw-Hill Book Company, Inc. Jan. 1956, chapter 11. If the number of early pulses delivered to the counter 10 exceeds the number of late pulses, the counter will increment or count up to the point at which an omit pulse is delivered to the phase changer 13 from the increment output lead of stage 5. Continued early pulses will subsequently cause delivery of another omit pulse to the phase changer and this process will continue as long as early pulses exceed late pulses. As will be explained hereinafter, however, a limit is soon imposed on the rate at which these omit pulses are delivered to the phase changer 13. This limit is determined by the phase correction rate control circuit 20.

A continued incrementing or counting up in the counter 10 will, of course, effect successive changes in state of the counter stages N and N-1. It is the states of these N and N-1 stages which function in cooperation with the logic of the rate control circuit 20 to set the rate of the phase changes introduced in timing waveform T. This will be described hereinafter.

If the number of late pulses delivered to the counter 10 exceeds the number of early pulses, the binary counter will, of course, decrement or count down and in the process deliver an add pulse or pulses to the phase changer 13. An add pulse or pulses serves, of course, to advance the phase of the timing wave T.

The reversible binary counter shown in FIG. 1 comprises seven stages. However, the number of stages is somewhat arbitrary and is determined by empirical considerations and the choice of the circuit designer. This is emphasized in the drawing by the fact that the last two counter stages are designated N and N-1 rather than 7 and 6, respectively. The binary counter 10 should comprise a sufficient number of stages to smooth or average out the effects of very short duration noise bursts. These noise bursts will result in a few early and late pulses being delivered to the counter. However, since these are of a more or less random nature, they will effectively cancel each other out. However, the smoothing or averaging function should not be such as to smooth out the phase or time jitter introduced by the transmission medium itself. In the instant case, it was found experimentally that a seven stage counter such as illustrated in FIG. 1 provided the desired smoothing or averaging function. However, in other and different environments a reversible binary counter of more or less than seven stages may prove useful.

The N and $\overline{N}$ and N-1 and $\overline{N-1}$ outputs of the last two stages of the reversible binary counter are delivered to the phase correction rate control circuit which, in response thereto, is operative to restrict to a preselected amount the rate at which the average phase of the timing signal T can be changed continuously in a given direction. This restriction is carried out by delivering a timeout inhibit signal to one or the other of the inhibit gates 21 or 22. This rate restriction operation will first be described in conjunction with FIGS. 4A—4I of the drawings; this functional description will then be followed by a detailed description of the rate control logic circuitry shown in detail in FIG. 2.

Bit-count integrity is assured, in accordance with the invention, by restricting the rate at which the average phase of T can be changed continuously in one direction to one-sixteenth of a bit interval in 0.1 second, while permitting fairly rapid random variations in phase of up to ± one-eighth of a bit interval around the average. The mode of operation of the circuitry that carries out these desired ends is symbolically illustrated in FIGS. 4A through 4I. The operation of the rate control circuit is controlled by the states and changes in the states of counter stages six and seven, herein designated stages N-1 and N, respectively. The states of the counter are referred to by the states of these stages in the following discussion.

The aforementioned operational symbolic diagrams will first be described in general terms and the basic operative rules that are controlling will be set forth; this will then be followed by several assumed conditions or situations and the mode or manner of operation of the inventive apparatus in response to each.

Figure 4A:
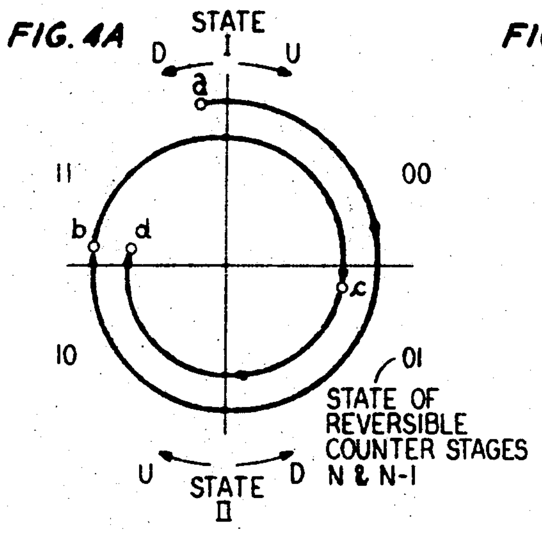
FIGS. 4A through 4I are symbolic diagrams that facilitate the explanation of the operation of the invention.

The rate control circuit has two basic states designated I and II in FIG. 4A, et seq., and each basic state has two substates, designated U and D. The basic states are distinguished by the reference about which the rapid phase changes are permitted. The reference in state I is the transition between counter states 00 and 11, while the reference in state II is the transition between counter states 01 and 10.

The four quadrants of FIG. 4A, et seq., are designated 00, 01, 10, and 11 in a clockwise order, starting with the upper right-hand quadrant. These quadrants have reference to the states of the binary counter—and particularly to the states of the last two stages thereof. Thus, if the counter is up-counting, the last two stages will progress through the designated states 00, 01, 10, and 11 in sequence; if the counter is down-counting this sequence is, of course, reversed. If the counter is in all zero state (i.e., all the stages are in a binary 0 state), 32 early input pulses will cause the last two stages of the counter to go from the 00 state to the 01 state and, as should be clear from the previous discussion, the timing wave T will at that time be retarded one thirty-second of a bit interval. Another 32 early pulses will progress the counter from state 01 to state 10 and the timing wave T will again be retarded one thirty-second of a bit interval. And so on. The process described is of course, reversed for a sequence of late pulses; and, each time the last stages of the counter change state (i.e., they down-count) the timing wave T is advanced one thirty-second of a bit interval. From the above, therefore, it should be apparent that the two references I and II are one-sixteenth of a bit interval apart.

The substates U and D are distinguished by the direction, up-counted or down-counted, that the counter passes through the basic state references. For example, if the circuit is in reference state I and the counter is in state 11, a series of early pulses will up-count the counter through state 11 and 00 and the circuit will be in the state IU. Subsequent late pulses will cause the counter to shift from state 00 to state 11 and will place the circuit in state ID. The substates are defined in the same way in state II except that the reference is changed.

A 0.1 second timeout circuit restricts the rate at which the circuit can shift between states I and II. If the circuit is in a given state, the time-out circuit is reset and started each time the state of the counter passes through that state reference. For example, if the circuit is in state I, the timeout circuit will be reset and started each time the state of the counter passes through reference I, in either direction. However, with the circuit in state I, the timeout circuit is now reset and started by passage of the state of the counter through reference II. The converse of the above, of course, also holds true. In summary, in state I, the timeout circuit of rate control 20 is started by a transition in the state of the counter from 11 to 00 or 00 to 11. Further, and this is important, a second consecutive transition through reference I in the same direction, permitted after the timeout interval passes, causes the circuit to shift to state II. The operation in state II is the same except that the reference is shifted to the transition between states 01 and 10.

As indicated hereinbefore, the 0.1 second timeout circuit comprises part of the rate control 20. The 0.1 second timeout interval was determined experimentally. As will be better appreciated later, when this interval is reduced below 0.1 second, bit-count integrity may sometimes be lost. While the interval can be increased without adversely affecting performance, clock accuracy requirements become more severe. The restriction on the rate at which phase can be changed one-sixteenth of a bit interval in 0.1 second requires that the frequency of the uncorrected receiver timing be within one part in $10^7$ of the transmitter clock frequency.

The basic states I and II are recorded in, and remembered by, a flip-flop memory circuit comprising part of the rate control 20. Similarly, the substates U and D are recorded in, and remembered by, a second flip-flop memory circuit of rate control 20. The U:D flip-flop is set to a given substate (U or D) when and only when the state I or state II reference is crossed during a countup or countdown operation.

With the timeout circuit active and the rate control circuitry in a particular one of the four states given below, further input pulses to the binary counter are inhibited and the counter stopped at the state indicated.

| Circuit state: | Counter stopped at— |
|---|---|
| IU | 11 |
| ID | 00 |
| IIU | 01 |
| IID | 10 |

The significance of this table will be more evident hereinafter.

Having described in general terms the symbolic diagrams FIG. 4A et seq. and the controlling operative rules, several assumed situations will now be set forth and the response of the inventive apparatus in each case will be described. Considering FIG. 4A, assume the state of the counter is presently at point *a* in quadrant 11, the rate control circuit is in state ID, and a series of early pulses are being delivered to the counter. With the counter up-counting the state I reference will be crossed, the rate control circuit will then be placed in the IU state and the timeout circuit reset and started. Now in response to continued early pulses the counter will up-count to the point *b* in quadrant 11 and will be stopped at that point if the timeout circuit is still active (see the table, supra). Thus, when the counter counts from the initial point *a* to *b*, four omit or retard pulses will be delivered to the phase changer 13 to retard the phase of T a total of four thirty-seconds or one-eighth of a bit interval. After the timeout circuit has timed out and early pulses continue to be delivered to the counter, the latter will up-count from point *b* to *c* in quadrant 01. When the counter goes from state 11 to state 00 and thus again crosses reference I, the rate control circuit is shifted to state IIU and in this state it will be seen from the table, supra, that the counter is stopped in the quadrant 01, assuming, of course, that the timeout circuit which was reset on crossing the state I reference is still active. In proceeding from *b* to *c*, the phase of T is retarded one-sixteenth of a bit interval and no further up-counting of the counter is permitted for the remainder of the 0.1 second timeout interval. After the timeout circuit times out, further early pulses will up-count the counter from point *c* to point *d*. During this latter up-count, the state II reference is once again crossed, switching the rate control circuitry to state IU and once again starting the timeout circuit. From the table, supra, it will again be seen that with the circuit in state IU the counter is stopped in quadrant 11, assuming once again the timeout circuit to be active. The phase of T is once again retarded one-sixteenth of a bit interval and further up-counting in the counter is inhibited during the remainder of the 0.1 second interval that the timeout circuit is active. The process continues in the described fashion in response to continued early pulses.

Figure 4B:
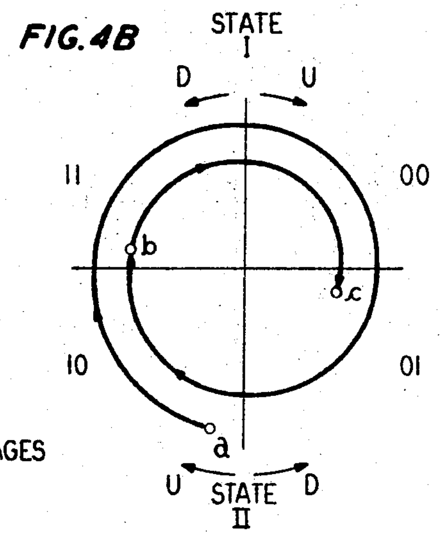

In FIG. 4B a second possible situation is assumed. The count in binary counter 10 is such that it is at *a* in quadrant 10, and the rate control circuit is assumed to be in state IIU. Further, the timeout circuit is assumed timed out and early pulses are being delivered to the counter input; that is, early pulses predominate. Since the circuit is in state IIU, the timeout circuit is not reset and started upon crossing the state I reference. However, upon crossing the state II reference, in response to a continued predominance of early pulses, the rate control circuit is switched to state IU, and the timeout circuit is reset and started at this time. Again, from the table, supra, it will be seen that with the rate circuit in state IU and the timeout circuit active, the counter is stopped at *b* in quadrant 11. The counter is then inhibited from up-counting further until the timeout circuit times out. Thus, the counter initially moves rapidly through four quadrants, and then is permitted to continue through quadrant 10 and into quadrant 11 where it is temporarily stopped. Accordingly, from the assumed initial condition the timing wave T is retarded a total of five thirty-seconds of a bit interval.

In response to continued predominant early pulses the counter will up-count from point *b* to *c* and then be inhibited from counting further. As the counter proceeds from *b* it will cross the state I reference and the rate circuit will be switched to state IIU and the timeout circuit triggered at this time. With the rate control circuit in the latter state and the timeout circuit active, the counter is inhibited or stopped when it advances into the quadrant 01. If early pulses continue, the counter will be successively advanced in interrupted steps and the timing wave T retarded one-sixteenth of a bit interval each 0.1 second time interval.

Figure 4C:
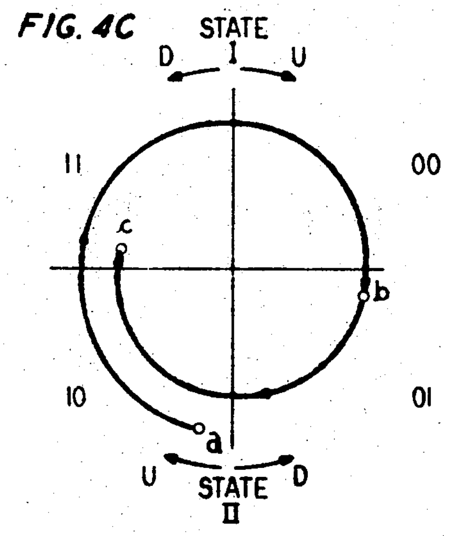
Figure 4D:
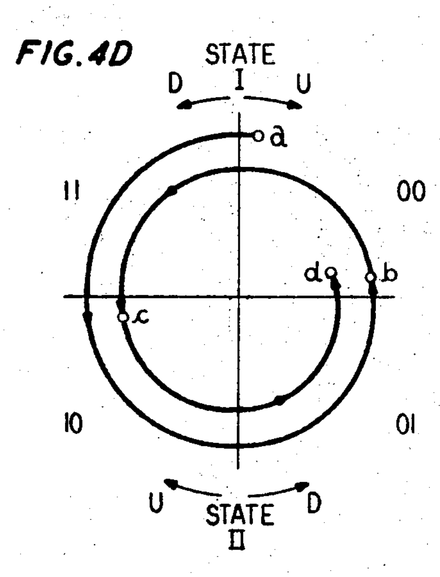

In FIG. 4C, a further situation is assumed. The count in the counter is such that the latter is at point *a* in quadrant 10 and the circuit is assumed in state IU; further, the timeout circuit has timed out. Now, in response to a series of early pulses the counter will be up-counted and cross the state I reference. Since the rate circuit was already in the state IU, the operative rules dictate that the rate circuit be switched to the state IIU. The timeout circuit is also started at this instant. From the table, supra, it will be seen that in state IIU the counter is stopped at quadrant 01, if the timeout circuit is still active. Hence, an up-count in the counter is temporarily inhibited and the counter remains at *b* until the 0.1 second interval terminates. Assuming a further predominance of early pulses, the counter is then advanced from *b* and crosses the state II reference at which time the rate circuit is switched to state IU and the timeout operation is started once again. Under these conditions, the counter is stopped at *c* as it advances into the quadrant 11; assuming, here again, the timeout circuit is still active.

In summary, the above examples typify the function of the present invention, namely the average phase of T may be changed (i.e., in these cases retarded) continuously in one direction by one-sixteenth of a bit interval each 0.1 second, while fairly rapid initial changes in phase of up to ± one-eighth of a bit interval about the average is permitted.

In the first three instances, supra, a continuing predominance of early pulses was assumed delivered to the reversible binary counter 10. In the three assumed situations to follow, a predominance of late pulses will be presumed. Considering FIG. 4D, let it be assumed that the state of the binary counter is presently at point *a* in quadrant 00, the rate control circuit is in state IU, and a predominant series of late pulses are being delivered to the counter. With the counter thus down-counting the state I reference will be crossed, the rate control circuit will then be placed in the ID state and the timeout circuit will be reset and started. In response to continued late pulses the counter will down-count to the point *b* in quadrant 00 and will be stopped at that point if the timeout circuit is still active (see the table, supra). When the counter counts down from the initial point *a* to point *b*, four advance pulses will be delivered to the phase changer 13 to advance the phase of T a total of four thirty-seconds or one-eighth of a bit interval. After the timeout circuit is timed out and a predominance of late pulses continue to be delivered to the counter, the latter will down-count from *b* to *c* in quadrant 10. When the binary counter goes from state 00 to state 11 and thus again crosses reference I in the same direction, the rate control circuit is shifted to state IID and in this state it will be seen from the table, supra, that the counter is stopped in the quadrant 10, assuming, of course, that the timeout circuit which was reset on crossing the state I reference is still active. In proceeding from *b* to *c*, the phase of T is advanced one-sixteenth of a bit interval; no further down-counting of the counter is permitted for the remainder of the 0.1 second timeout interval. After the timeout circuit times out, further late pulses will down-count the counter from point *c* to *d*. During this latter down-count, the state II reference is crossed, switching the rate control circuit to state ID and once again starting the timeout circuit. From the table, supra, it will again be seen that with the circuit in state ID the counter is stopped in quadrant 00, assuming the timeout circuit to be active. The phase of T is again advanced one-sixteenth of a bit interval and further down-counting in the counter is inhibited during the remainder of the 0.1 second timeout interval. The process continues in the described fashion in response to a continued predominance of late pulses.

Figure 4E:
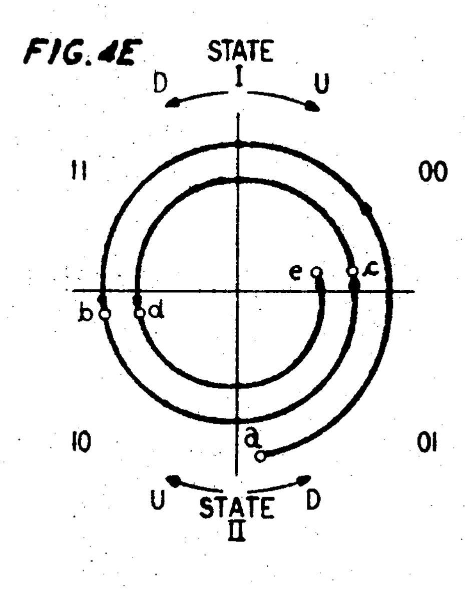

In FIG. 4E another possible situation is assumed. The count in the binary counter is such that it is at point *a* in quadrant 01 and the rate control circuit is here assumed to be in state ID; the timeout circuit is not presently active, and late pulses are being delivered to the binary counter. When the state I reference is crossed in response to continued late pulses the rate control circuit shifts to state IID and the timeout circuit is reset and started. Again, from the table, supra, it will be seen that with the rate control circuit in state IID and the timeout circuit active, the counter is automatically stopped in quadrant 10 (point *b* ). The counter is then inhibited from down-counting further until the timeout circuit times out. Accordingly, in this instance, from the assumed initial condition the timing wave T is advanced a total of three thirty-seconds of a bit interval.

In response to a continued predominance of late pulses the counter will down-count from point *b* to point *c* and then be temporarily inhibited from counting further. As the counter proceeds from *b* it will cross the state II reference and the rate control circuit will be switched to state ID and the timeout circuit triggered at this time. With the rate control circuit in the latter state and the timeout circuit active, the counter is inhibited or stopped when it advances into the quadrant 00. After the timeout interval, if late pulses continue to predominate, the counter will be successively down-counted in interrupted steps to points *d*, *e*, etc., and the timing wave T advanced one-sixteenth of a bit interval each 0.1 second interval.

Figure 4F:
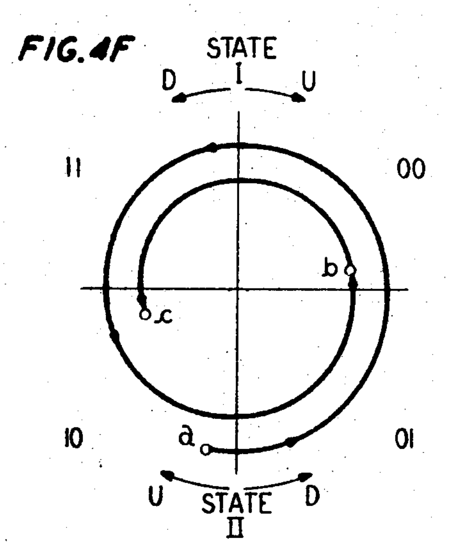

In FIG. 4F, a further and different initial situation is assumed. The count in the counter is such that the latter is at point *a* in quadrant 10, the timeout circuit is assumed timed out, and the rate control circuit is in state IU. Now, in response to a series of late pulses the counter will be down-counted and cross the state I reference. Since the rate control circuit was in state IU, the operative rules dictate that the rate circuit be switched to state ID. The timed out circuit is also started at this instant. From the table, supra, it will be seen that in state ID the counter is stopped in quadrant 00 (point *b*), if the timeout circuit is still active. Hence, a further down-count in the counter is temporarily inhibited at *b* and the counter remains at *b* until the 0.1 second interval terminates. Assuming a further predominance of late pulses, the counter is then decremented from *b* and crosses the state I reference in the same direction as previous, at which time the rate control circuit is shifted to state IID and the timeout operation is started again. Under these conditions, the counter is stopped at *c* as it moves into quadrant 10, assuming, here again, that the timeout circuit is still active.

In summary, the above three examples again typify the operation of the present invention, namely, the average phase of T may be changed (i.e., in these cases advanced) continuously in one direction by one-sixteenth of a bit interval each 0.1 second, while permitting fairly rapid initial changes in phase in excess of one-sixteenth of a bit interval.

Figure 4G:
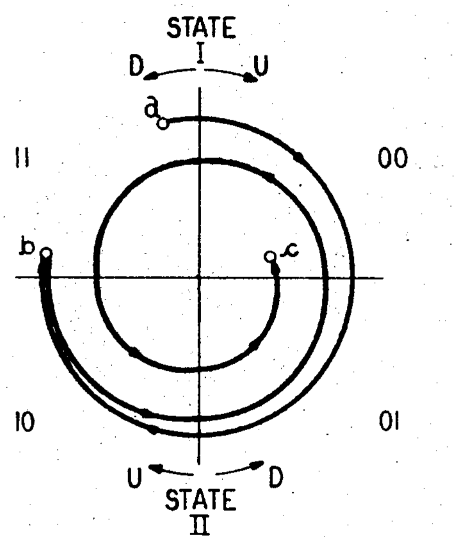

In the next two cases, an assumed predominance of early pulses is followed by a predominance of late pulses and vice versa. In FIG. 4G, let it be assumed that the state of the counter is at *a* in quadrant 11, the rate control circuit is in state ID and a predominant series of early pulses are now being delivered to the counter. With the counter up-counting the state I reference will be crossed, the rate control circuit will then be placed in the IU state and the timeout circuit will be reset and started. In response to continued early pulses the counter will up-count to the point *b* in quadrant 11 and will be stopped there if the timeout circuit is still active (see table, supra). Let it now be assumed that late pulses begin to predominate, thereby causing a down-count in the counter. When the state I reference is crossed, the rate control circuit is placed in the state ID and the timeout circuit is reset and started. The down-count is then inhibited or stopped in the counter, at point *c*, when the counter crosses into quadrant 00.

If late pulses continue after the timeout circuit has timed out, the counter will down-count to quadrant 10 and be stopped once again till the timeout circuit times out, all as heretofore described. However, if early pulses are now found to predominate, the counter will up-count from point *c* and return to point *b*, at which point it is stopped. In up-counting from point *a* to point *b* the phase of T is retarded four thirty-seconds or one-eighth of a bit interval. Then, in response to late pulses, the phase of T is advanced seven thirty-seconds of a bit interval as the counter moves from point *b* to point *c* in FIG. 4G. The net result of these two successive operations is that the phase of T is advanced about the average three thirty-seconds of a bit interval (+seven thirty-seconds − four thirty-seconds = three thirty-seconds).

Figure 4H:
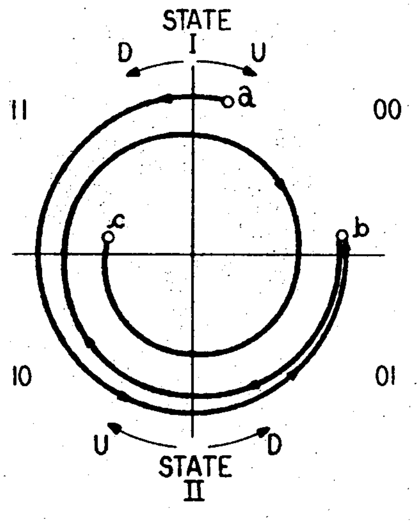

In FIG. 4H, it is assumed that the state of the counter is at *a* in quadrant 00, the rate control circuit is in state IU, and predominant late pulses are being delivered to the counter. With the counter down-counting, the state I reference will be crossed, the rate control circuit will then be placed in the state ID and the timeout circuit will be reset and started. The counter thus down-counts to the point *b* in quadrant 00 and it will be stopped at that time if the timeout circuit is still active (see the table, supra). Let it now be assumed that early pulses predominate, thereby causing an up-count in the binary counter. As an up-count continues in the binary counter the state I reference will be crossed, the rate control circuit will then be placed in the state IU and the timeout circuit reset and started. The up-count continues and is eventually stopped when the counter crosses into the quadrant 11 (point *c*).

If early pulses continue after the timeout circuit has timed out, the counter will up-count to quadrant 01 and be stopped once again till the timeout circuit times out, all as previously described. However, if late pulses are now found to predominate, the counter will down-count from point *c* and return to point *b*, where it will be temporarily stopped. In down-counting from *a* to *b*, the phase of T is advanced four thirty-seconds or one-eighth of a bit interval. Then, in response to early pulses, the phase of T is retarded seven thirty-seconds of a bit interval as the counter up-counts from point *b* to point *c*. The net result of these two successive operation is that the phase of T is retarded about the average a total of three thirty-seconds of a bit interval.

Figure 4I:
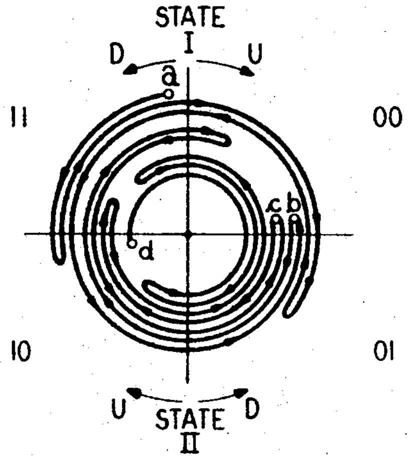

FIG. 4I typifies a situation which might more readily be encountered in practice. The counter is assumed at point *a* in quadrant 11 and the rate control circuit is in state ID. With the occurrence of a burst of late pulses delivered to the counter, the latter will down-count to the quadrant 10 (T is advanced in phase one thirty-seconds of a bit interval in this process). When quadrant 10 is reached, a predominance of early pulses then occurs, causing the count in the counter to reverse and continue up-counting to the quadrant 01 (T is now retarded three thirty-seconds of a bit interval during this up-counting). When the state I reference was crossed, the rate control circuit was switched to state IU and the timeout circuit reset and started.

Should a predominance of late pulses now occur the counter will begin to down-count from quadrant 01 and in the process once again cross the state I reference. The rate control circuit is switched to state ID at this time and the timeout circuit reset and started. Assuming late pulses continue to predominate, the counter will down-count to the point *b* in quadrant 00 where, if the timeout circuit is still active, it will be stopped as per the table, supra. In the process of down-counting from quadrant 01 to the point *b* in quadrant 00, the phase of T is advanced five thirty-seconds of a bit interval. At point *b* additional late pulses are inhibited and further down-counting in the counter is inhibited for the 0.1 second timeout interval. However, should a predominance of early pulses now occur during the timeout interval, the counter will immediately begin up-counting from the point *b*. With a continuing predominance of early pulses delivered to the counter, the state of the latter will cross reference state I, at which time the rate control circuit will switch to state IU and the timeout circuit will be reset and started. Early pulses continue to up-count the counter through the state I reference and into quadrant 00 (the phase of T is retarded four thirty-seconds of a bit interval in this last up-counting process).

With the counter up-counted to some midpoint in quadrant 00, a predominance of late pulses are now assumed to occur, causing the counter to down-count through the state I reference. On crossing reference I, the rate control circuit is switched to state ID and the timeout circuit reset and started. Should late pulses continue to predominate, the counter will be down-counted to the point *c* in quadrant 00, at which time further down-counting is inhibited for the remainder of the 0.1 second timeout interval. In this last process of going from the midpoint in quadrant 00 to point *c*, the phase of T is advanced four thirty-seconds or one-eighth of a bit interval.

If, on reaching *c*, a predominance of early pulses immediately occurs, the counter will start up-counting and, it is assumed, this up-count continues so as to carry the state of the counter into quadrant 11 (the phase of T is thus retarded three thirty-seconds of a bit interval).

As the counter reaches a midpoint in quadrant 11, a series of late pulses is now assumed to occur. If this series of late pulses continues and the timeout circuit has now timed out, the counter will proceed through the quadrants 10, 01, 00 and cross the state I reference, entering quadrant 11. On crossing the state I reference, the rate control circuit will be switched to IID and the timeout circuit reset. In going from the midpoint of quadrant 11 through quadrants 10, 01, 00, and into quadrant 11, the phase of T is advanced four thirty-seconds or one-eighth of a bit interval.

Next, a predominance of early pulses are assumed to occur, causing an up-count in the counter. If the counter continues to up-count, the state II reference will be crossed and, in the process, the rate control circuit switched to state IIU and the timeout circuit reset and started. Early pulses are assumed to continue until the state of the counter is shifted to the midpoint of quadrant 10, at which time a predominance of late pulses now begin to occur. With a continuance of late pulses, the counter is down-counted through the state II reference, the rate control circuit is switched to state IID and the timeout circuit reset and started. Should late pulses continue to predominate, the counter will proceed to down-count to the point *d* in quadrant 10 at which point further down-counting is temporarily inhibited for the remainder of the timeout interval. In down-counting to point *d* the phase of T is advanced four thirty-seconds or one-eighth of a bit interval. Further early and/or late pulses will continue to alter the state of the counter causing the phase of T to continuously be retarded and/or advanced in accordance with the above description.

Figure 2:
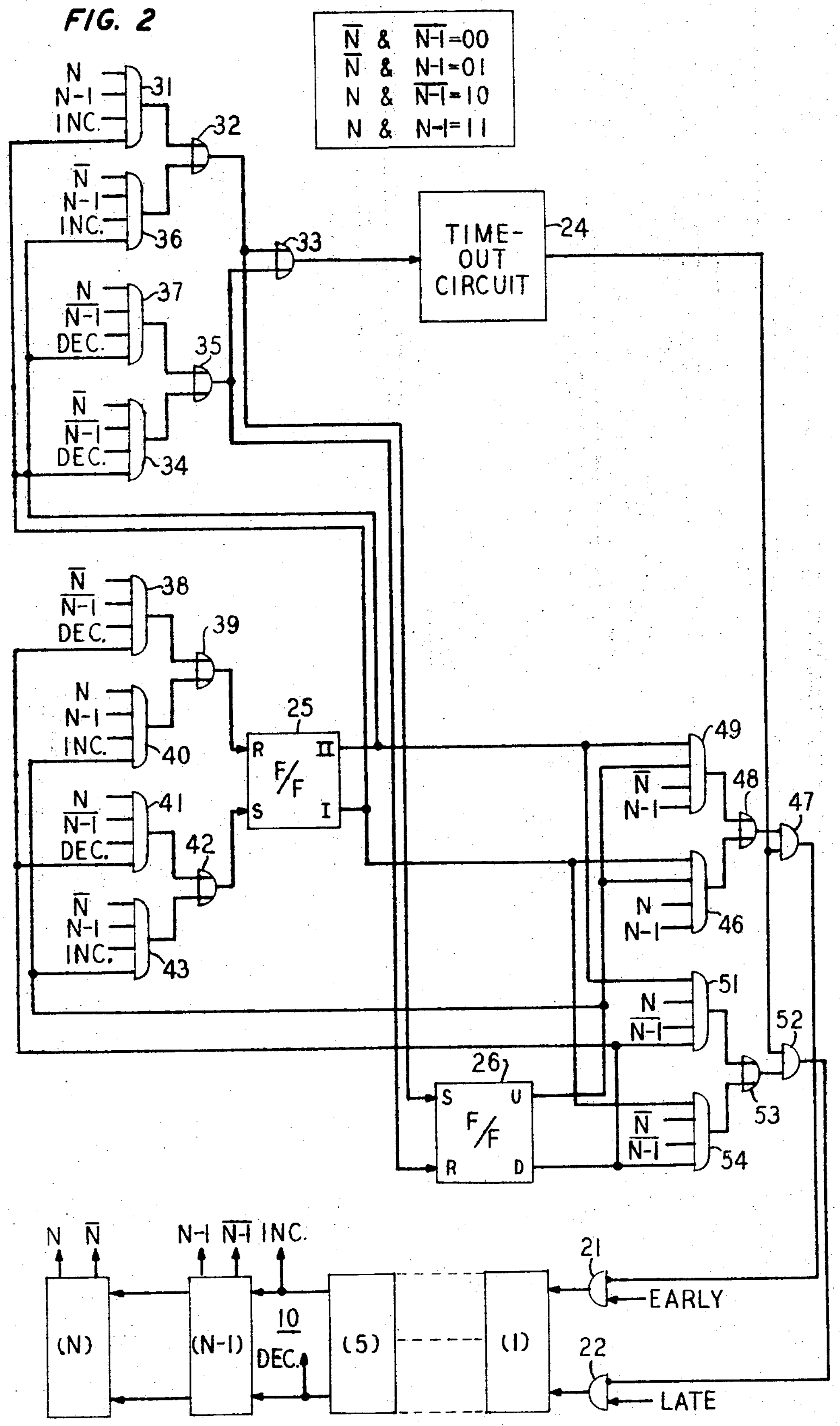
FIG. 2 is a detailed schematic diagram of the phase correction rate control circuit of FIG. 1.

Turning now to FIG. 2 of the drawings, the logic circuitry illustrated therein carries out the above-recited operative rules of the phase correction rate control circuit. This circuitry comprises the 0.1 second timeout circuit 24, the state reference flip-flop 25 and the substate U-D flip-flop 26. The timeout circuit may comprise a conventional monostable multivibrator. As in FIG. 1, the reversible binary counter 10 comprises, for example, seven stages, the last two stages being designated N and N-1. The states of the counter are referred to by the states of the last two stages. The early and late pulses are coupled to the binary counter via the inhibit gates 21 and 22. To simplify the drawing, airline connections from the counter to the various AND gate inputs are utilized. A legend, listing the four possible states of the N and N-1 counter stages, is shown in FIG. 2 to aid in relating the circuit logic to the symbolic diagrams of FIG. 4A et seq.

With the state reference flip-flop 25 in state I and the binary counter in its 11 state (i.e., stages N and N-1 are in their 1 state), the AND gate 31 is enabled so that the next increment pulse from stage 5 of the counter is passed by the AND gate 31 and OR gates 32 and 33 to the input of the timeout circuit 24 to start the timeout operation. This input pulse to the timeout circuit is also coupled to the set terminal of flip-flop 16 to set the same to its U state. This operation is indicative of the fact that the counter is up-counting through the state I reference. The rate control circuit is now in state IU.

With the state reference flip-flop 25 in state I and the counter in its 00 state (i.e., stages N and N-1 are in their 0 state), the AND gate 34 is enabled so that the next decrement pulse from stage 5 of the counter is passed by the AND gate to the timeout circuit 24 via OR gates 35 and 33. This decrement pulse is also coupled to the reset terminal of flip-flop 26 to set the same in its D state. This operation is indicative of the fact that the counter is down-counting through the state I reference and the rate control circuit is accordingly set to state ID.

With the state reference flip-flop 25 in state II and the counter in its 01 state, the AND gate 36 is enabled to pass an increment pulse from state 5 of the counter to the timeout circuit 24 via AND gate 36 and OR gates 32 and 33. This increment pulse is also coupled to the set terminal of flip-flop 26 to set the same in its U state. This operation is indicative of the fact that the counter is up-counting through the state II reference and the rate control circuit is accordingly set to state IIU.

With the state reference flip-flop 25 in state II and the counter in its 10 state, the AND gate 37 is enabled to pass a decrement pulse from the output of stage 5 of the counter to the timeout circuit 24 via AND gate 37 and OR gates 35 and 33. This decrement pulse is also coupled to the reset terminal of flip-flop 26 to set the same in its D state. This operation is indicative of the fact that the counter is down-counting through the state II reference and the rate control circuit is now set to its IID state.

With the flip-flop 26 set in its D state and the counter in state 00, the AND gate 38 is enabled to pass a decrement pulse from stage 5 of the counter to the reset terminal of state reference flip-flop 25 via OR gate 39. If the flip-flop 25 is already in state II it remains there, whereas, if it had been in state I it is switched to state II. Thus, if the rate control circuit was previously in state ID, the counter down-counts through the state I reference and the rate control circuit is then switched to the state IID, as heretofore explained with reference to the symbolic diagrams of FIG. 4.

With the flip-flop 26 set in its U state and the counter in state 11, the AND gate 40 is enabled to pass an increment pulse from stage 5 of the counter to the reset terminal of state reference flip-flop 25 via OR gate 39. If the flip-flop 25 is already in its state II it remains there, whereas, if it had been in state I it is switched to state II. Thus, if the rate control circuit was previously set in state IU, the counter then up-counts through the state I reference and the rate control circuit is then switched to the state IIU, as heretofore explained with reference to the symbolic diagrams of FIG. 4.

With the flip-flop 26 set in its D state and the counter in state 10, the AND gate 41 is enabled to pass a decrement pulse from stage 5 of the counter to the set terminal of state reference flip-flop 25 via OR gate 42. If the flip-flop 25 is already in state I it remains there, whereas, if it had been in state II it is switched to state I. Thus, if the rate control circuit was previously in state IID, the counter then down-counts through the state II reference and the rate control circuit is then switched to the state ID, as heretofore explained.

With the flip-flop 26 set in its U state and the counter in state 01, the AND gate 43 is enabled to pass an increment pulse from stage 5 of the counter to the set terminal of the state reference flip-flop 25 via OR gate 42. If the flip-flop 25 is already in state I it remains there, whereas, if it had been in state II it is switched to state I. Thus, if the rate control circuit was previously in state IIU, the counter then up-counts through the state II reference and the rate control circuit is then switched to the state IU, as previously explained with reference to the symbolic diagrams.

If the rate control circuit is in state IU (i.e., flip-flop 25 set to state I and flip-flop 26 set to state U), the AND gate 46 is enabled when the binary counter reaches state 11 (the N and N-1 input leads to AND gate 46 are both energized). Thus, the AND gate 46 delivers an enabling signal to the AND gate 47 via OR gate 48. With the AND gate 47 thereby enabled and the timeout circuit reset and started, the AND gate 47 will deliver an inhibit signal to the inhibit terminal of gate 21. Accordingly, for the duration of the 0.1 second timeout interval early pulses are inhibited and the up-count in the binary counter is temporarily stopped.

If the rate control circuit is in state IIU (i.e., flip-flop 25 set to state II and flip-flop 26 set to state U), the AND gate 49 is enabled when the binary counter reaches state 01 (the $\overline{N}$ and N-1 input leads to AND gate 49 are both energized). Thus, the AND gate 49 delivers an enabling signal to the AND gate 47 via OR gate 48. With the AND gate 47 so enabled and the timeout circuit presently timing-out, the AND gate 47 will deliver an inhibit signal to the inhibit terminal of gate 21. Accordingly, for the duration of the 0.1 second timeout interval early pulses are inhibited and the up-count in the binary counter is temporarily stopped.

If the rate control circuit is in state IID (i.e., flip-flop 25 set to state II and flip-flop 26 set to state D), the AND gate 51 is enabled when the binary counter reaches state 10 (the N and $\overline{N-1}$ input leads to AND gate 51 are both energized). Thus, the AND gate 51 delivers an enabling signal to the AND gate 52 via OR gate 53. With AND gate 52 enabled and the timeout circuit presently timing out, the AND gate 52 will deliver an inhibit signal to the inhibit terminal of gate 22. Accordingly, for the duration of the 0.1 second timeout interval late pulses are inhibited and the down-count in the binary counter is temporarily stopped.

If the rate control circuit is in state ID (i.e., flip-flop 25 set to state I and flip-flop 26 set to state D), the AND gate 54 is enabled when the binary counter reaches state 00 (the $\overline{N}$ and $\overline{N-1}$ input leads to AND gate 54 are both energized). Thus, the AND gate 54 delivers an enabling signal to the AND gate 52 via OR gate 53. With the AND gate 52 enabled and timeout circuit 24 timing out, the AND gate 52 will deliver an inhibit signal to the inhibit terminal of gate 22. Accordingly, for the duration of the 0.1 second timeout interval late pulses are inhibited and the down-count in the binary counter is temporarily stopped.

As explained, the present invention permits rapid random variations in phase of up to ± one-eighth of a bit interval about the average, while restricting continued phase corrections in the same direction to one-sixteenth of a bit interval in 0.1 second. It should be clear, however, that the specified limits have been chosen primarily for purposes of illustrating the principles of the present invention and the invention is in no way limited to the limits selected. For example, continuous phase corrections in the same direction can readily be limited to one thirty-seconds of a bit interval in the 0.1 second time period. Further, it should be apparent that the timeout interval can be changed at the option of the circuit designer. Accordingly, it is to be understood that the foregoing disclosure is merely illustrative of the application of the principles of the present invention and numerous modifications or alterations may be devised by those skilled in the art without departing from the spirit and scope of the invention.

I claim:

1. In a digital communication system which includes receiver apparatus for receiving a digital bit stream that jitters in phase and periodically suffers relatively longterm outages and master clock apparatus for locally generating a timing signal having a repetition rate which corresponds approximately to the rate of the received digital bit stream, which system is characterized by means for comparing the phase of the locally generated timing signal with that of the received digital bit stream, means responsive to the phase comparison for rapidly changing the phase of said timing signal to maintain the same in phase correspondence with said received digital bit stream, and means for restricting to a preselected amount the rate at which the average phase of the timing signal can be changed continuously in one direction.

2. In a digital data communication system, means for receiving a serial digital message bit stream, means for locally generating a timing signal having a repetition rate which corresponds substantially to the rate of the received digital bit stream, means for comparing the phase of said timing signal with that of the received digital bit stream, means responsive to the phase comparison for rapidly changing the phase of said timing signal to maintain the same in phase alinement with said received digital bit stream, and means for restricting to a preselected fraction of a bit interval the rate at which the average phase of the timing signal can be changed continuously in one direction.

3. A digital communication system as defined in claim 2 wherein the timing signal generating means comprises an oscillator for generating a signal having a frequency of 2nT, where T is the repetition rate of the timing signal, and a divider circuit of $n$ stages to which the 2nT signal is delivered.

4. A digital communication system as defined in claim 3 wherein phase changes are made in increments of $\frac{1}{2^n}$ of a bit interval.

5. A digital communication system as defined in claim 4 wherein $n$ equals five and the restricting means serves to restrict the rate at which the average phase of the timing signal can be changed continuously in one direction to one-sixteenth of a bit interval in 0.1 second while permitting rapid random variations in phase of up to ± one-eighth of a bit interval about the average.

6. A digital communication system as defined in claim 2 including a reversible binary counter of N stages to which the output of the phase comparing means is delivered, the output of the N-2 stage of the binary counter being coupled to the phase changing means to effect phase changes in said timing signal.

7. A digital communication system as defined in claim 6 wherein an increment output signal from the N-2 stage of the reversible binary counter serves to retard the phase of the timing signal a predetermined amount, while a decrement output signal from said N-2 stage serves to advance the phase of the timing signal said predetermined amount.

8. A digital communication system as defined in claim 7 wherein the rate restricting means selectively inhibits binary counter operation in response to a continuing count therein in the same direction in excess of a given count rate.